US009038683B2

(12) United States Patent
Sawai (10) Patent No.: US 9,038,683 B2
(45) Date of Patent: May 26, 2015

(54) PNEUMATIC TIRE (75) Inventor: Masayoshi Sawai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 302 days.

(21) Appl. No.: 13/477,782

(22) Filed: May 22, 2012

(65) Prior Publication Data

US 2012/0318420 A1 Dec. 20, 2012

(30) Foreign Application Priority Data

Jun. 20, 2011 (JP) .................................. 2011-136546

(51) Int. Cl.
B60C 11/04 (2006.01)
B60C 11/12 (2006.01)
B60C 11/13 (2006.01)
B60C 11/03 (2006.01)

(52) U.S. Cl.
CPC ........... B60C 11/0306 (2013.04); B60C 11/042 (2013.04); B60C 11/1315 (2013.04); B60C 11/1236 (2013.04); B60C 11/1323 (2013.04); B60C 11/1392 (2013.04); B60C 2011/0346 (2013.04); B60C 2011/0344 (2013.04); B60C 2011/1338 (2013.04); B60C 2011/0381 (2013.04); B60C 2011/0372 (2013.04); Y10S 152/03 (2013.01)

(58) Field of Classification Search
CPC ............ B60C 11/1315; B60C 11/1323; B60C 2011/1338; B60C 11/1384; B60C 11/1392
USPC ............. 152/209.18, 209.21, 209.24, 209.15, 152/DIG. 3
See application file for complete search history.

(56) References Cited

U.S. PATENT DOCUMENTS

| 6,203,640 | B1 * | 3/2001 | Campana et al. ........... 156/110.1 |
| 7,527,082 | B2 * | 5/2009 | Fukunaga ................ 152/209.24 |
| 7,607,464 | B2 * | 10/2009 | Murata .................... 152/209.24 |
| 8,573,269 | B2 * | 11/2013 | Mita .......................... 152/209.8 |
| 2006/0137791 | A1 * | 6/2006 | Miyabe et al. ........... 152/209.18 |
| 2010/0089509 | A1 * | 4/2010 | Ochi ........................ 152/209.15 |
| 2010/0212795 | A1 * | 8/2010 | Murata .................... 152/209.18 |

FOREIGN PATENT DOCUMENTS

| JP | 07-076205 | * | 3/1995 |
| JP | 2001-071709 | * | 3/2001 |
| JP | 2007-176282 A |   | 7/2007 |

OTHER PUBLICATIONS

English machine translation of JP2001-071709, dated Mar. 2001.*
English machine translation of JP07-076205, dated Mar. 1995.*

* cited by examiner

Primary Examiner — Steven D Maki
Assistant Examiner — Robert Dye
(74) Attorney, Agent, or Firm — Birch, Stewart, Kolasch & Birch, LLP (57) ABSTRACT

A pneumatic tire comprises a tread portion, at least two circumferentially and continuously extending longitudinal grooves being provided with the tread portion, a land portion divided between the longitudinal grooves, a plurality of lateral grooves being provided with the land portion, each lateral grooves with one end communicating with one of the longitudinal grooves and the other end extending toward a tire equator, the longitudinal groove with a groove wall to which lateral grooves are connected, in each section between lateral grooves adjacent to a circumferential direction of the tire, the groove wall having a protruded portion and a dent portion being formed the nearest side of the tire equator, the protruded portion inclined with respect to the circumferential direction of the tire so as to gradually reduce a width of the longitudinal groove toward at least one lateral groove.

14 Claims, 8 Drawing Sheets

PNEUMATIC TIRE

BACKGROUND OF THE INVENTION

1. Field of the Invention

The present invention relates to a pneumatic tire that can improve noise resistance while maintaining drainage performance and uneven wear resistance.

2. Description of the Related Art

It is generally known that pass-by noises caused by vehicles are greatly influenced by resonance of air (air column resonance) passing through tire grooves. To reduce such pass-by noises, it has been suggested to reduce the groove width of circumferentially and continuously extending longitudinal grooves and to provide a tie bar or the like to lateral grooves communicating with the longitudinal grooves.

However, these approaches of reducing the width of longitudinal grooves and providing lateral grooves with a tie bar, decrease groove volume to thereby bring about deterioration of drainage performance.

SUMMARY OF THE INVENTION

The present invention is devised in light of such circumferences. A main object of the present invention is to provide a pneumatic tire which can improve noise resistance while maintaining drainage performance and uneven wear resistance, basically wherein a groove wall of a longitudinal groove between lateral grooves is formed by a dent portion being formed the nearest side of a tire equator and a protruded portion protruding from the dent portion and inclined with respect to a direction so as to gradually reduce a width of the longitudinal grooves, and the protruded portion includes a main surface extending from a groove bottom and a slant surface with an inclined angle larger than that of the main surface.

According to the present invention, a pneumatic tire comprising a tread portion, at least two circumferentially and continuously extending longitudinal grooves being provided with the tread portion, at least one land portion divided between the longitudinal grooves, a plurality of lateral grooves being provided with the land portion, said each lateral grooves having one end communicating with one of the longitudinal grooves and the other end extending toward a tire equator, said longitudinal groove having a groove wall to which said lateral grooves are connected, in each section between lateral grooves adjacent to a circumferential direction of the tire, said groove wall having at least one protruded portion and a dent portion being formed the nearest side of the tire equator, the protruded portion inclined with respect to the circumferential direction of the tire so as to gradually reduce a width of the longitudinal groove toward at least one lateral groove, and in a cross section of the groove wall, the protruded portion comprising a main surface which extends radially outside from the groove bottom of the longitudinal groove and a slant surface extending from a radially outer edge of the main surface to a ground contact surface of the land portion and having an inclined angle larger than that of the main surface.

BRIEF DESCRIPTION OF THE DRAWINGS

FIG. 6b is a partial perpendicular view of FIG. 6a.

FIG. 7b is a partial perpendicular view of FIG. 7a.

FIG. 8b is a partial perpendicular view of FIG. 8a.

DESCRIPTION OF THE PREFERRED EMBODIMENTS

One embodiment of the present invention will be described below with reference to the drawings.

Figure 1:
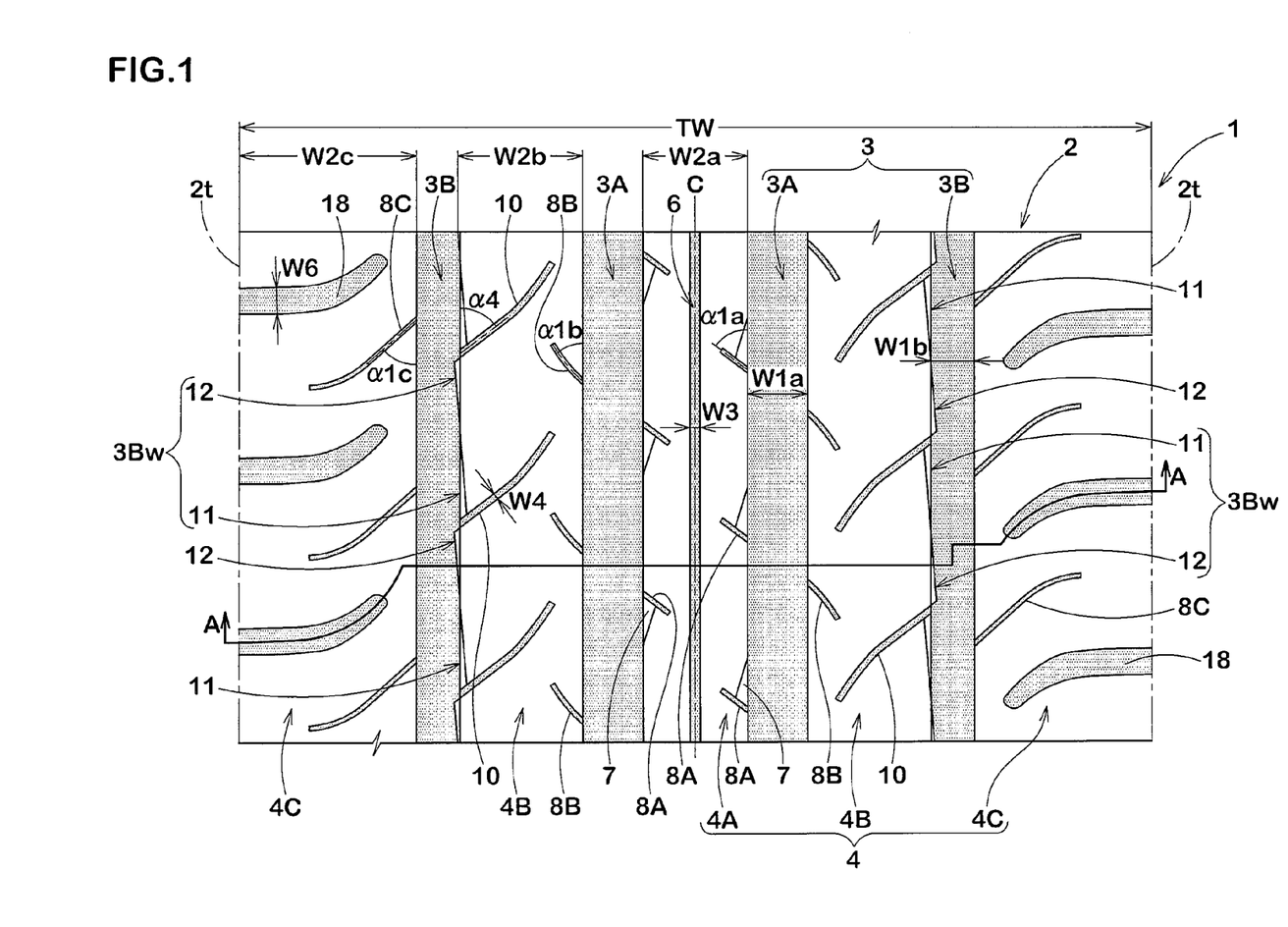
FIG. 1 is a development view of a tread portion of a pneumatic tire of an embodiment of the present invention.
Figure 2:
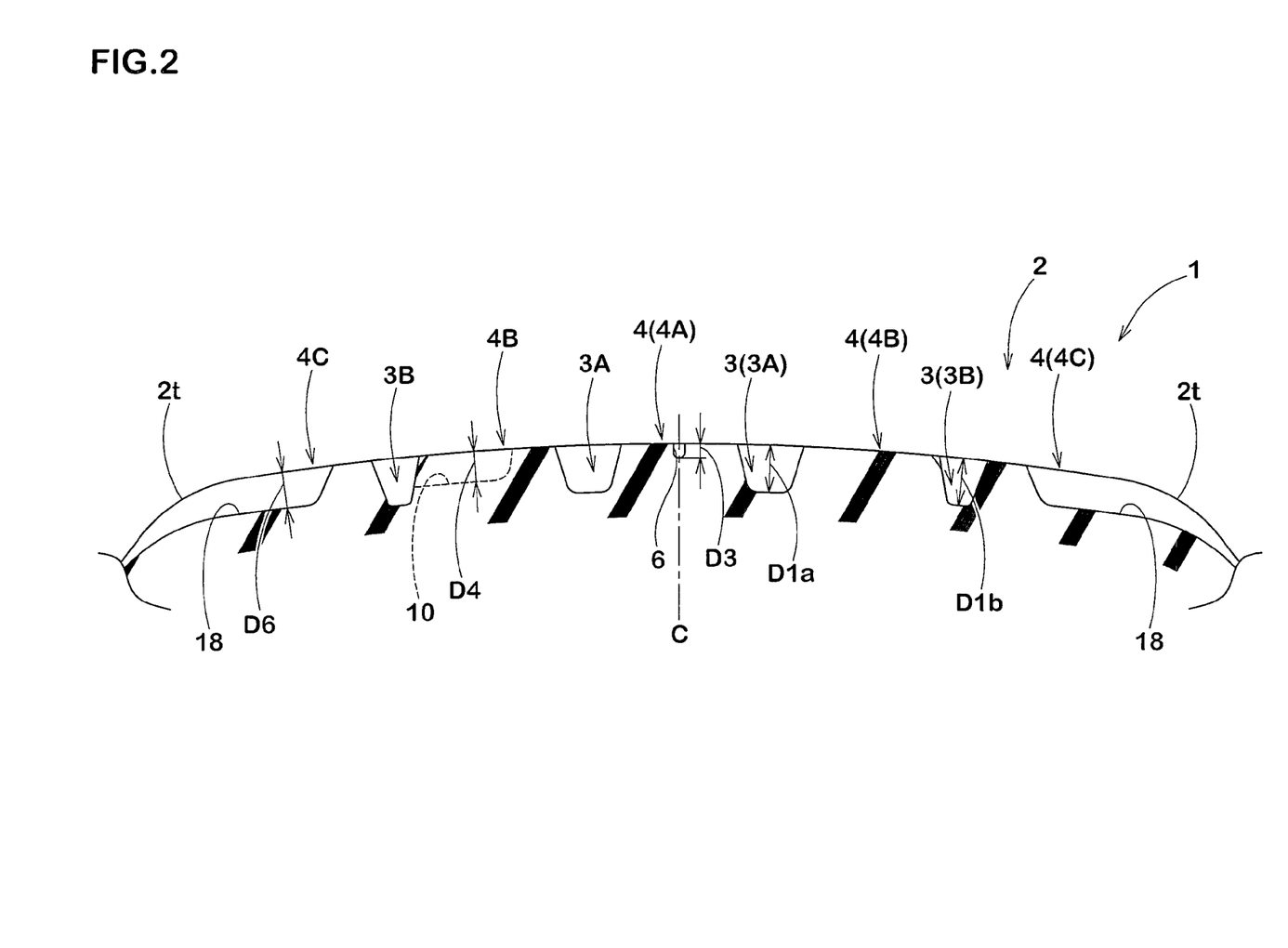
FIG. 2 is a cross sectional view taken along the line A-A of FIG. 1.

As shown in FIGS. 1 and 2, a pneumatic tire 1 of the present embodiment (hereinafter, also referred to simply as "tire") is suitably used for passenger cars, for example. The tire 1 has a tread portion 2 with at least two circumferentially and continuously extending longitudinal grooves 3 and at least one land portion 4 between the longitudinal grooves 3. In this embodiment, the tread portion 2 has a non-designated rotational direction pattern.

The longitudinal grooves 3 of the present embodiment comprise a pair of center longitudinal grooves 3A disposed on both side of a tire equator C and a pair of shoulder longitudinal grooves 3B disposed axially outside the center longitudinal grooves 3A.

The center longitudinal groove 3A and the shoulder longitudinal grooves 3B extend in a straight form along the circumferential direction of the tire. The thus configured straight longitudinal grooves can improve drainage performance by smoothly discharging water between the tread portion and road surface through the longitudinal grooves 3 to backward in the direction of rotation of the tire. The maximum groove widths W1a and W1b of the center longitudinal groove 3A and the shoulder longitudinal grooves 3B are preferably set in a range of from 3 to 10% of the tread contact width TW, and the maximum groove depths D1a and D1b are preferably set in a range of from 6 to 10 mm.

The tread contact width TW is a distance between the tread edges 2t, 2t in the tire axial direction.

Here, the tread edges 2t are the axial outermost edges of the ground contacting patch of the tread portion at a camber angle of zero degree in a standard loaded condition that the ti re is mounted on a standard wheel rim and inflated to a standard pressure and loaded with a standard load.

The standard wheel rim is a wheel rim officially approved for the tire by standard organization, i.e. JATMA, T&RA, ETRTO and the like. The standard rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at various cold Inflation Pressures" table in TRA or the like. In case of passenger car tires, however, the standard pressure is uniformly defined by 180 kPa.

The standard load is a tire load specified by the standard organization above. For example, the standard load is the "maximum load capacity" in JATMA, the "Load Capacity" in ETRTO, the maximum value given in the above-mentioned table in TRA or the like.

Dimensions and the like of parts of the tire have values under a standard unloaded condition that the tire is mounted on the standard wheel rim and inflated to the standard pressure but loaded with no tire load, unless otherwise stated.

Moreover, the maximum groove width W1a of the center longitudinal groove 3A is preferably formed larger than the maximum groove width W1b of the shoulder longitudinal groove 3B. Accordingly, the center longitudinal grooves 3A can effectively discharge a water film between the tread portion 2 near the tire equator C and the load surface, thereby improving drainage performance. Meanwhile, the shoulder longitudinal grooves 3B can decrease air columns passing therethrough to reduce air column resonance, thereby improving noise resistance.

If the ratio (W1a/W1b) of the maximum groove width W1a of the center longitudinal grooves 3A and the maximum groove width W1b of the shoulder longitudinal grooves 3B is small, a water film between the tread portion 2 near the tire equator C and the road surface may not be sufficiently discharged. In contrast, if the ratio (W1a/W1b) is larger, air columns passing through the shoulder longitudinal grooves 3B may not be sufficiently decreased. From this point of view, the ratio (W1a/W1b) is preferably 1.5 or more, more preferably 1.6 or more, and is preferably 1.8 or less, more preferably 1.7 or less.

The land portion 4 includes a center land portion 4A between center longitudinal grooves 3A and 3A, a pair of middle land portions 4B between the center longitudinal groove 3A and the shoulder longitudinal groove 3B, and a pair of shoulder land portions 4C between the shoulder longitudinal groove 3B and the tread edge 2t.

The center land portion 4A is formed as a rib which circumferentially and continuously extends between the center longitudinal grooves 3A and 3A. The description "circumferentially and continuously" here indicates that the center land portion 4A is not divided by a lateral grooves passing over the entire width of the center land portion 4A.

The center land portion 4A can effectively enhance circumferential rigidity and improve straight-ahead driving stability. Preferably, a maximum width W2a of the center land portion 4A in a tire axial direction is desirably about 8 to 15% of the tread contact width TW.

In addition, the center land portion 4A is provided with a circumferentially and continuously extending center sub-groove 6, and center sipes 8A extending with inclination from both edges of the center land portion 4A toward the tire equator C. Chamfered edges 7 are provided at acute-angled corners between the center sipes 8A and the both edges of the center land portion 4A.

The center sub-groove 6 extends circumferentially and continuously on the tire equator C. The center sub-groove 6 can effectively discharge a water film between the center land portion 4A and the road surface, thereby enhancing drainage performance. Preferably, a groove width W3 of the center sub-groove 6 is about 5 to 15% of the maximum width W2a of the center land portion 4A, and a groove depth D3 of the center sub-groove (shown in FIG. 2) is desirably about 1 to 4 mm.

The center sipes 8A each extend with inclination from the both edges of the center land portion 4A and terminate without reaching the center sub-groove 6. In addition, the center sipes 8A each are inclined at an angle $\alpha 1a$ of about 40 to 60 degrees with respect to the circumferential direction of the tire, and are alternately arranged in the circumferential direction of the tire on the both edges of the center land portion 4A. The center sipes 8A can effectively discharge a water film between the center land portion 4A and the road surface while suppressing deterioration in rigidity at the center land portion 4A.

The chamfered edges 7 are formed by denting a tread surface of the center land portion 4A in an approximate triangular shape in a planar view, ranging from the center sipes 8A toward the center longitudinal grooves 3A. In addition, the chamfered edges 7 are alternately arranged in the circumferential direction of the tire at the both edges of the center land portion 4A. The chamfered edges 7 can suppress occurrence of damage such as tipping at the acute-angled corners between the center sipes 8A and the both edges of the center land portions 4A. The chamfered edges 7 can also effectively suppress generation of noises due to air column resonance by disturbing vibration of air columns formed between the center longitudinal grooves 3A and the road surface, thereby improving noise resistance.

The middle land portions 4B are also formed as a rib which circumferentially and continuously extends between the center longitudinal grooves 3A and the shoulder longitudinal grooves 3B. The middle land portions 4B can suppress an amount of lateral deformation at cornering and improve steering stability performance. Preferably, a maximum width W2b of the middle land portions 4B is about 10 to 18% of the tread contact width TW.

In addition, the middle land portions 4B are each provided with middle sipes 8B extending with inclination from the center longitudinal groove 3A outwardly in the tire axial direction, and lateral grooves 10 each including one end communicating with the shoulder longitudinal groove 3B and the other end extending with inclination toward the tire equator C. In this embodiment, the middle sipes 8B and the lateral grooves 10 are alternately arranged in the circumferential direction of the tire on the both edges of the middle land portions 4B.

The middle sipes 8B each extend with inclination from the center longitudinal grooves 3A outwardly in the tire axial direction and terminate without reaching the shoulder longitudinal grooves 3B. In addition, an angle $\alpha 1b$ formed by the middle sipes 8B with respect to the circumferential direction of the tire is set at about 30 to 60 degrees. The thus configured middle sipes 8B can enhance drainage performance while suppressing deterioration in rigidity of the middle land portions 4B.

The lateral grooves 10 each extend with inclination in the opposite direction of the middle sipes 8B with respect to the circumferential direction of the tire, and include one end communicating with the shoulder longitudinal groove 3B and the other end terminating without reaching the center longitudinal grooves 3A. The thus configured lateral grooves 10 can smoothly guide a water film between the middle land portions 4B and the road surface, to the shoulder longitudinal grooves 3B, thereby enhancing drainage performance.

To effectively enhance the foregoing drainage performance, an angle $\alpha 4$ formed by the lateral grooves 10 with respect to the circumferential direction of the tire is desirably 30 to 60 degrees. If the angle $\alpha 4$ exceeds 60 degrees, water films between the middle land portions 4B and the road surface may not be guided smoothly. In contrast, if the angle $\alpha 4$ is less than 30 degrees, the lateral grooves 10 are excessively inclined toward the circumferential direction of the tire, and rigidity of the middle land portions 4B may not be sufficiently maintained, thereby resulting in occurrence of uneven wear.

From this point of view, the angle α4 is more preferably 50 degrees or less, and is more preferably 40 degrees or more.

From the same point of view, the groove width w4 of the lateral grooves 10 is desirably set from 1.0 to 2.0 mm. If the groove width w4 is less than 1.0 mm, water films between the middle land portions 4B and the road surface may not be sufficiently discharged. In contrast, if the groove width w4 exceeds 2.0 mm, rigidity of the middle land portions 4B may not be sufficiently maintained.

Further, a groove depth D4 (shown in FIG. 2) of the lateral grooves 10 is preferably 65% or more of the maximum groove depth D1b of the shoulder longitudinal grooves 3B, and is preferably 90% or less of the same.

Figure 3:
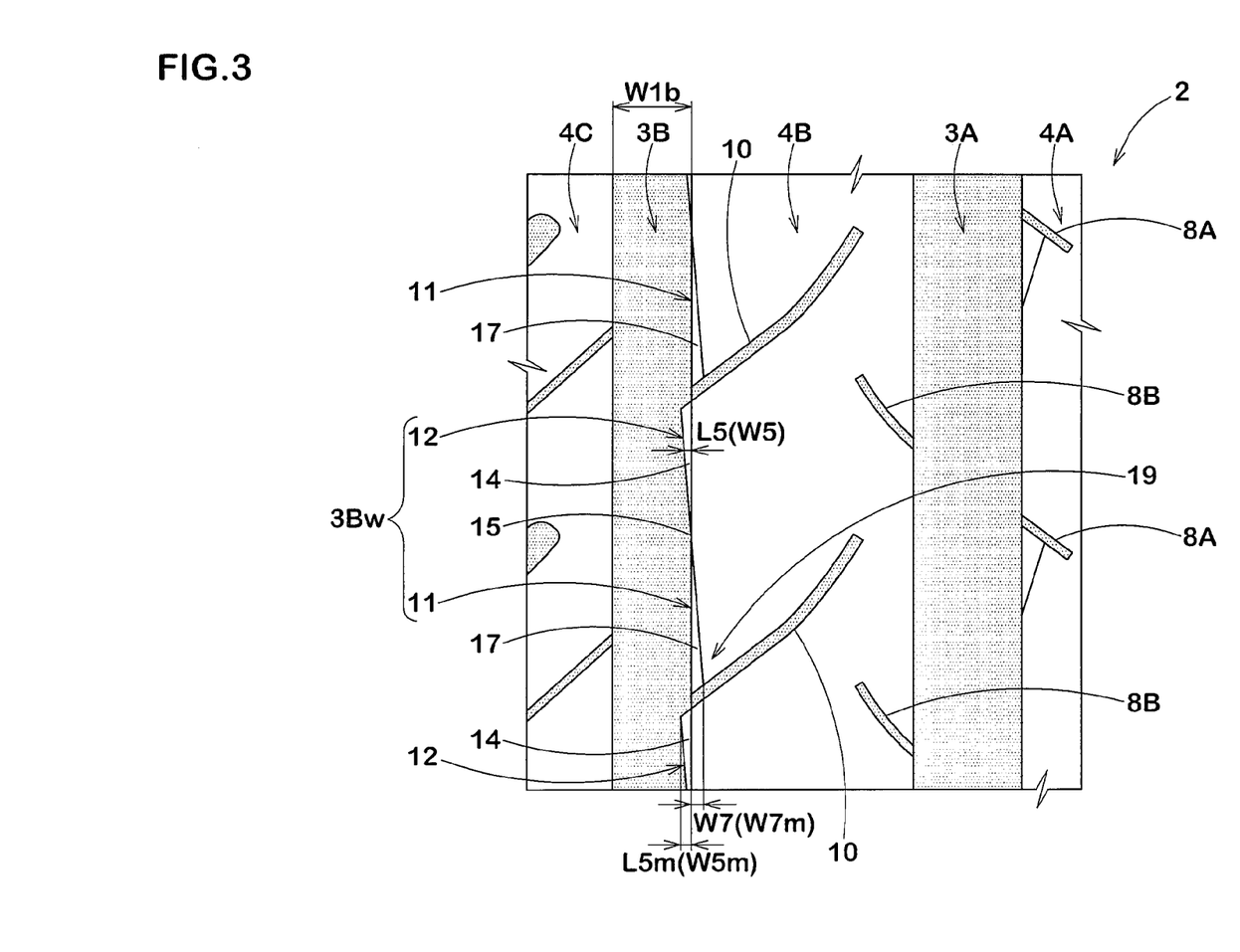
FIG. 3 is a partial enlarged view of FIG. 1.

In this embodiment, as shown in the enlarged view of FIG. 3, in each section of a groove wall 3Bw of the shoulder longitudinal groove 3B, between the lateral grooves 10 and 10 adjacent to each other in the circumferential direction of the tire at the middle land portion 4B, a dent portion 11 and a protruded portion 12 are provided.

The dent portion 11 is formed the nearest side of the tire equator C. The protruded portion 12 protrudes with inclination from the dent portions 11 toward one of the lateral grooves 10 in the circumferential direction of the tire so as to gradually reduce a width of the shoulder longitudinal groove 3B. On the other hand, the groove wall of the shoulder longitudinal groove 3B on the tread edge 2t side extends circumferentially and continuously in a straight shape.

The thus configured protruded portion 12 allows the groove wall 3Bw of the shoulder longitudinal groove 3B to be irregularly shaped with dents and protrusions in a planar view, thereby disturbing vibration of air columns formed between the shoulder longitudinal grooves 3B and the road surface. Therefore, the dent portions 11 and the protruded portions 12 can effectively suppress generation of noises due to air column resonance at the shoulder longitudinal grooves 3B, thereby improving noise resistance.

Figure 4:
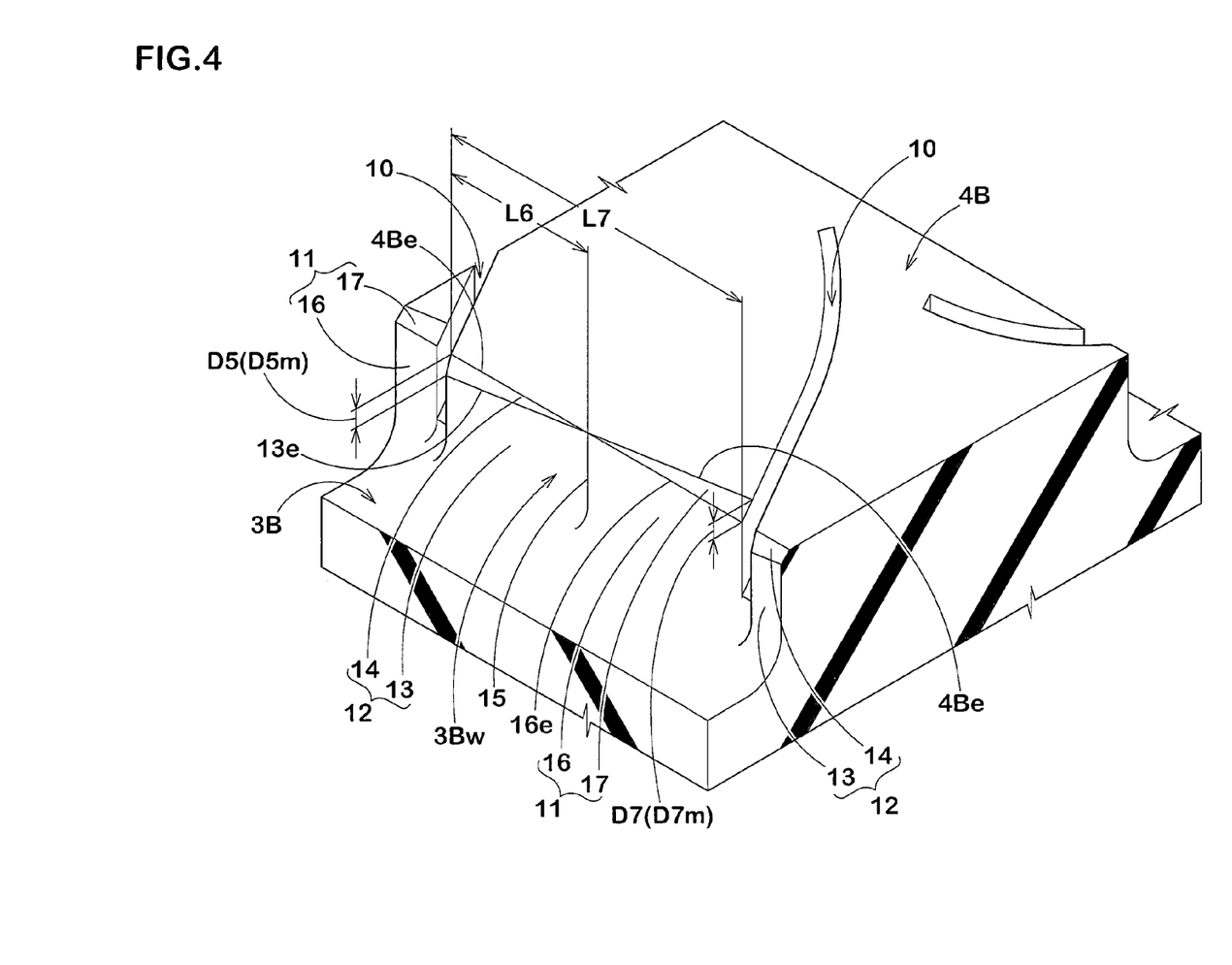
FIG. 4 is a partial perpendicular view of a middle land portion.

Each dent portion 11 in this embodiment is formed by a main surface 16 and a slant surface 17. The main surface 16 rises from a groove bottom of the shoulder longitudinal groove 3B and extends in the circumferential direction of the tire. The slant surface 17 connects between an outer edge 16e of the main surface 16 and an edge 4Be of a ground contact surface of the middle land portion 4B. The slant surfaces 17 can increase a groove volume of the shoulder longitudinal grooves 3B to thereby improve drainage performance and disturb vibration of air columns formed between the shoulder longitudinal grooves 3B and the road surface to thereby improve noise resistance.

In addition, the slant surface 17 in this embodiment each has a width W7 in the tire axial direction and a length D7 in the tire radial direction, two of which gradually increase from the protruded portion 12 side toward the other lateral groove 10. The thus configured slant surfaces 17 can smooth out great rigidity variations that are apt to be formed at the middle land portions 4B, by acute-angled corners 19 between the other lateral groove 10 and the shoulder longitudinal groove 3B, thereby preventing generation of uneven wear.

To ensure compatibility between the drainage performance and the noise resistance, the ratio (W7m/W1b) between a maximum length W7m of the slant surfaces 17 in the tire axial direction and the maximum groove width W1b of the shoulder longitudinal grooves 3B is desirably 10 to 30%. If the ratio (W7m/W1b) is less than 10%, sufficient disturbance may not be generated in vibration of air columns formed between the shoulder longitudinal grooves 3B and the road surface. In contrast, if the ratio (W7m/W1b) exceeds 30%, the middle land portions 4B may be excessively deteriorated in rigidity.

From this point of view, the ratio (W7m/W1b) is more preferably 15% or more, and is more preferably 25% or less.

From the same point of view, the ratio (D7m/D1b) between a maximum length D7m of the slant surface 14 in the tire radius direction and a maximum groove depth D1b (shown in FIG. 2) of the shoulder longitudinal grooves 3B is preferably 35% or less, more preferably 30% or less, and is preferably 15% or more, more preferably 20% or more.

The protruded portions 12 in this embodiment are formed at the shoulder longitudinal grooves 3B. In general, the shoulder longitudinal grooves 3B have larger influence on pass-by noises of vehicles as compared to the center longitudinal grooves 3A. Therefore, in this embodiment, the protruded portions 12 can effectively improve noise resistance. Meanwhile, the center longitudinal grooves 3A do not have the protruded portions 12 and therefore suppress deterioration in drainage performance. As a matter of course, the protruded portions 12 can be formed at the center longitudinal grooves 3A.

To effectively provide the noise resistance, the ratio (L5m/W1b) between a maximum length L5m of the protruded portions 12 in the tire axial direction and the maximum groove width W1b of the shoulder longitudinal grooves 3B is desirably 10 to 30%. If the ratio (L5m/W1b) is less than 10%, sufficient disturbance may not be generated in vibration of air columns formed between the shoulder longitudinal groove 3B and the road surface. In contrast, if the ratio (L5m/W1b) exceeds 30%, the shoulder longitudinal grooves 3B become small in groove volume, which may result in deterioration of drainage performance. From this point of view, the ratio (L5m/W1b) is more preferably 15% or more, and is more preferably 25% or less.

In addition, the protruded portions 12 in this embodiment are each formed by a main surface 13 and a slant surface 14. The main surface 13 rises from a groove bottom of the shoulder longitudinal groove 3B. The slant surface 14 connects between an outer edge 13e of the main surface 13 and an edge 4Be of a ground contact surface of the middle land portion 4B and has an inclined angle larger than that of the main surface 13.

The thus configured slant surfaces 14 can minimize influence of reduction in groove volume of the shoulder longitudinal grooves 3B due to presence of the protruded portions 12, thereby preventing deterioration in drainage performance. In addition, the slant surfaces 14 can suppress grounding of the protruded portions 12, which makes rigidity of the middle land portions 4B approach a uniform level in the circumferential direction, thereby preventing generation of uneven wear.

Further, together with the slant surfaces 17 of the dent portions 11, the slant surfaces 14 of the protruded portions 12 can suppress deterioration in rigidity of the middle land portions 4B on both sides of intersections between the lateral grooves 10 and the shoulder longitudinal grooves 3B in the circumferential direction of the tire, and can make rigidity of the middle land portions 4B further approach a uniform level in the circumferential direction of the tire, thereby effectively preventing generation of uneven wear.

The slant surfaces 14 in this embodiment each have a width W5 in the tire axial direction and a length D5 in the tire radius direction, two of which gradually increase from the dent portion 11 side toward one of the lateral grooves 10. Accordingly, the slant surfaces 14 can gradually increase the width W5 with increase in the length L5 of the protruded portions 12 in the tire axial direction, thereby making circumferential rigidity of the middle land portions 4B further approach a uniform level and improving uneven wear resistance.

To effectively produce the foregoing effects, the maximum width W5m of the slant surfaces 14 is desirably set within the same range of the maximum length L5m of the protruded portions 12.

In addition, the ratio (D5m/D1b) between the maximum length D5m of the slant surfaces 14 in the tire radius direction and the maximum groove depth D1b (shown in FIG. 2) of the shoulder longitudinal grooves 3B is desirably 15 to 35%. If the ratio (D5m/D1b) is less than 15%, drainage performance may not be sufficiently improved. In contrast, if the ratio (D5m/D1b) exceeds 35%, sufficient disturbance may not be generated in vibration of air columns formed between the shoulder longitudinal grooves 3B and the road surface. From this point of view, the ratio (D5m/D1b) is more preferably 20% or more, and is more preferably 30% or less.

Further, to form the dent portions 11 and the protruded portions 12 in a balanced manner, the ratio (L6/L7) between a circumferential length L6 on the tread ground contact surface from one of the lateral grooves 10 to a boundary 15 between the dent portion 11 and the protruded portion 12 and a circumferential length L7 between the lateral grooves 10 and 10, is desirably 0.33 to 0.67.

If the ratio (L6/L7) is less than 0.33, the protruded portions 12 become smaller and sufficient disturbance may not be generated in vibration of air columns formed between the shoulder longitudinal grooves 3B and the road surface. Further, the middle land portions 4B may become uneven in circumferential rigidity, thereby generating uneven wear. In contrast, if the ratio (L6/L7) exceeds 0.67, the protruded portions 12 become larger, which may deteriorate drainage performance. From this point of view, the ratio (L6/L7) is more preferably 0.4 or more, and is more preferably 0.6 or less.

Figure 5:
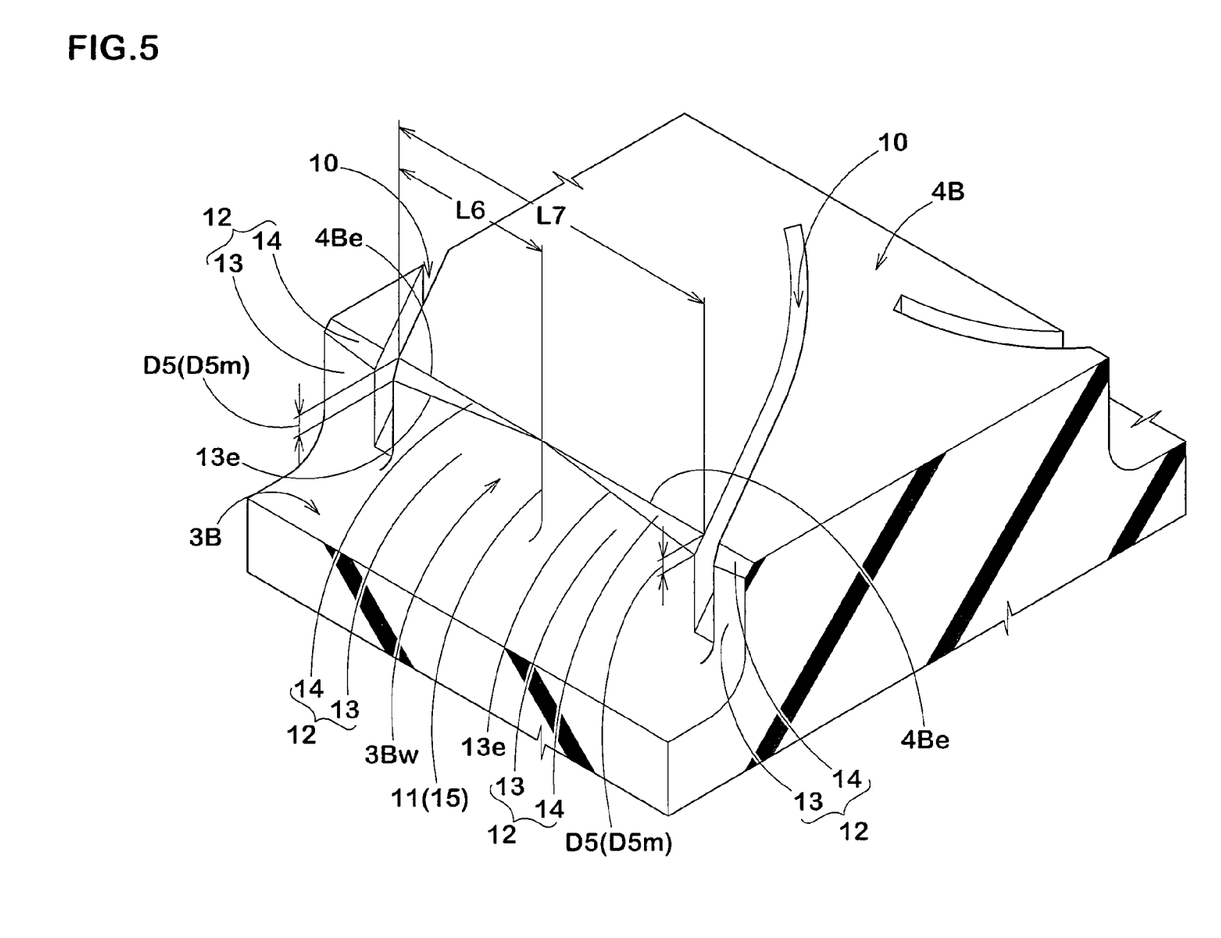
FIG. 5 is a partial perpendicular view of a middle land portion of another embodiment.
Figure 6A:
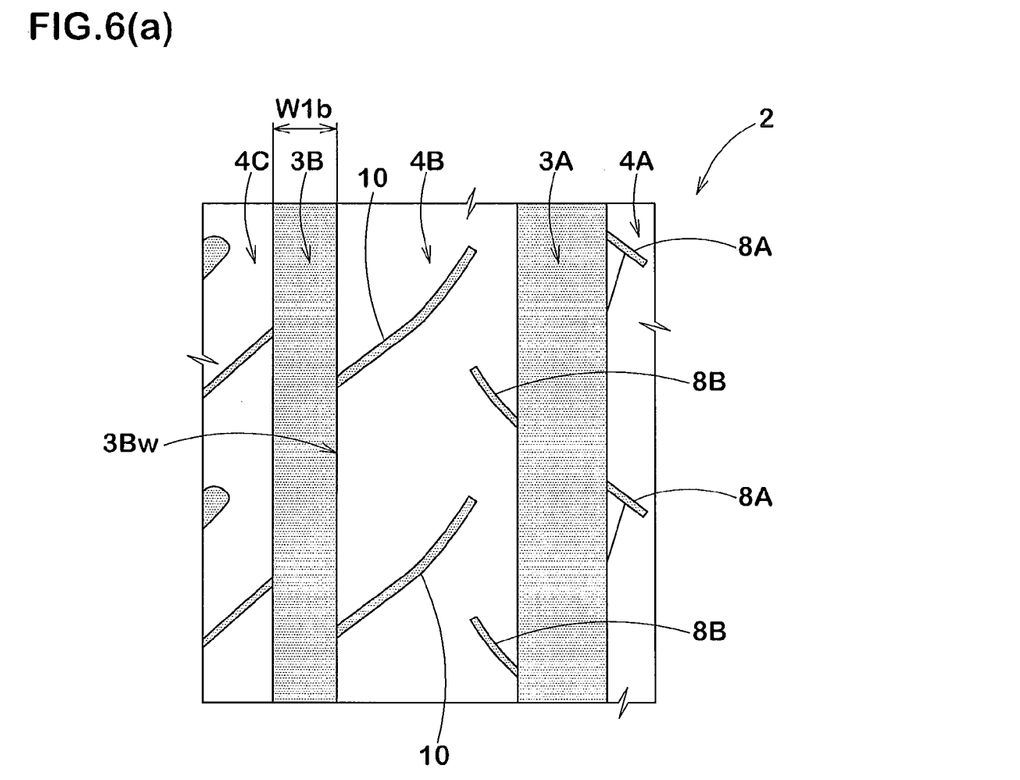
FIG. 6a is a plane view of a middle land portion of a comparative example 1.
Figure 6B:
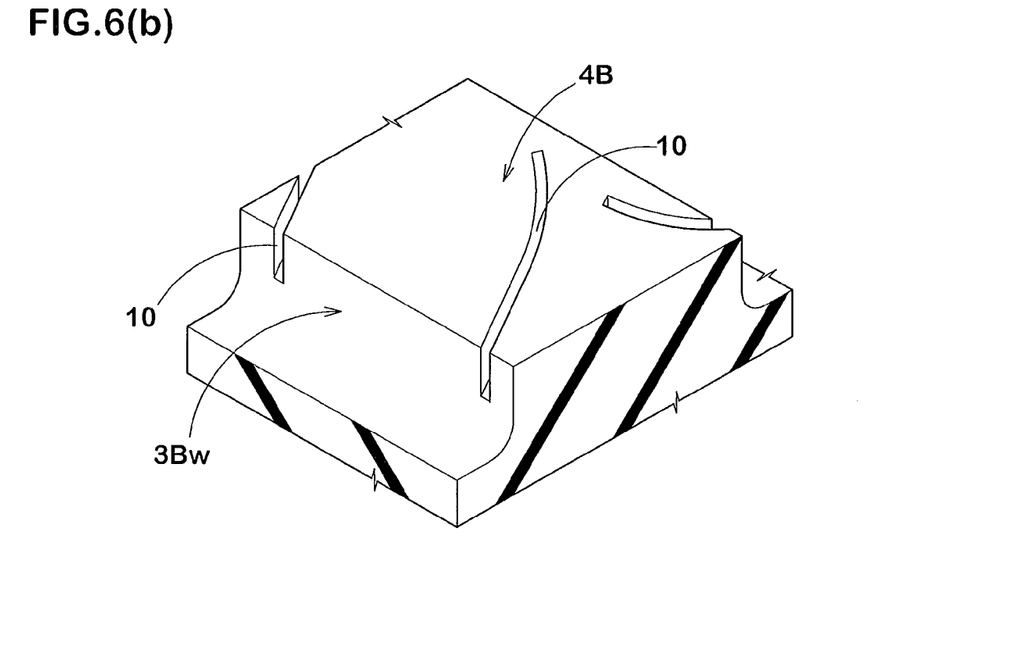
Figure 7A:
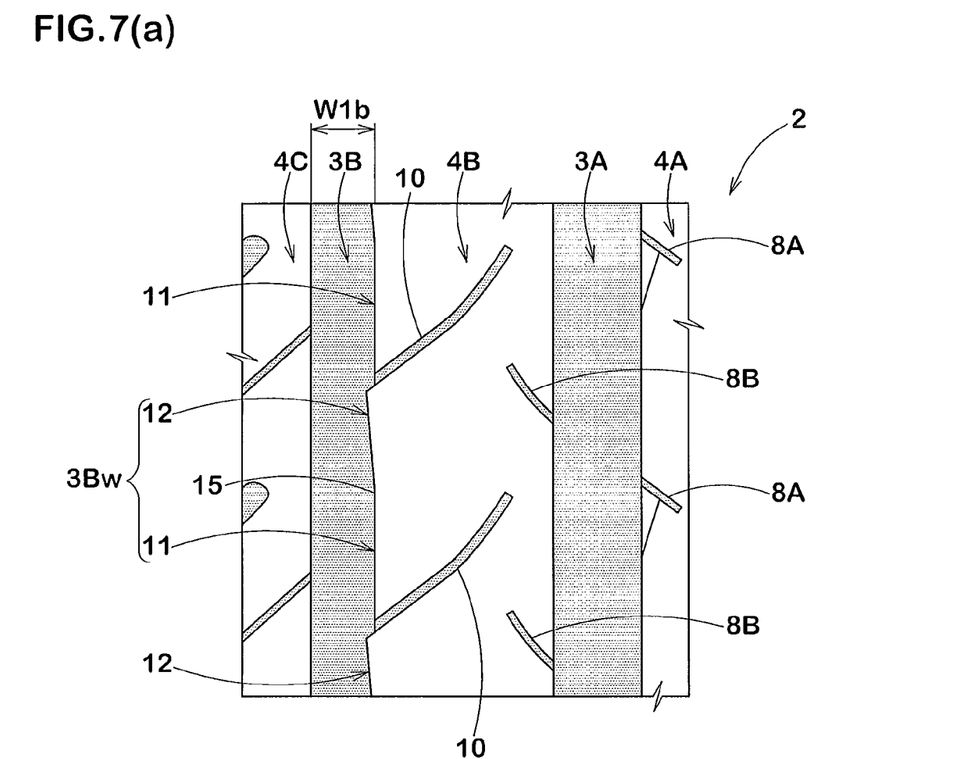
FIG. 7a is a plane view of a middle land portion of a comparative example 2.
Figure 7B:
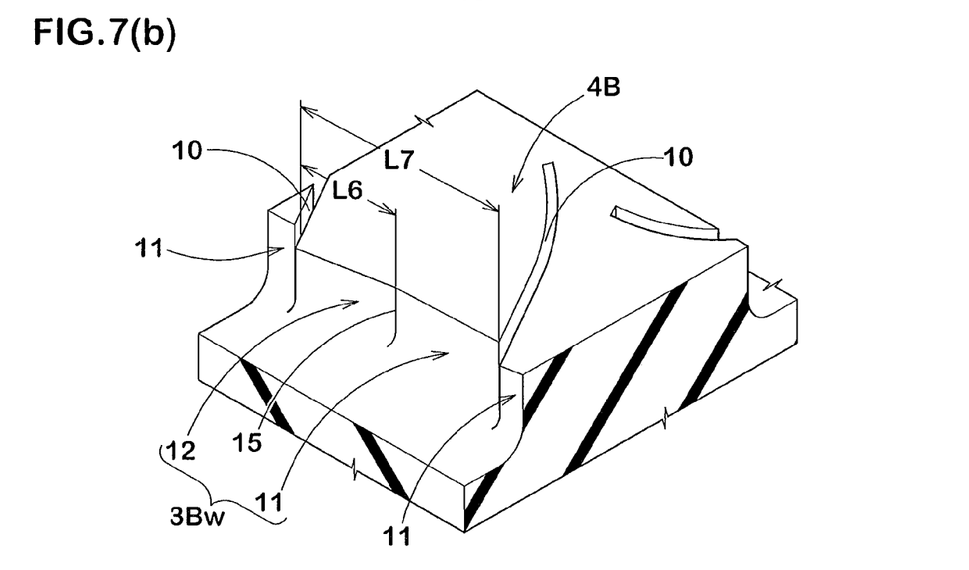
Figure 8A:
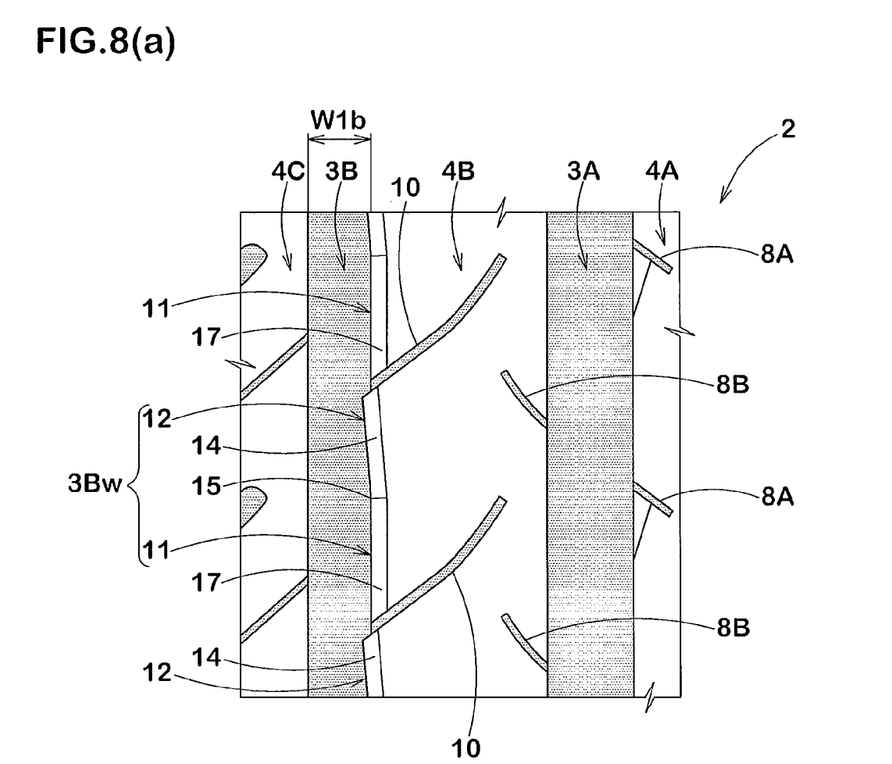
FIG. 8a is a plane view of a middle land portion of an example 8.
Figure 8B:
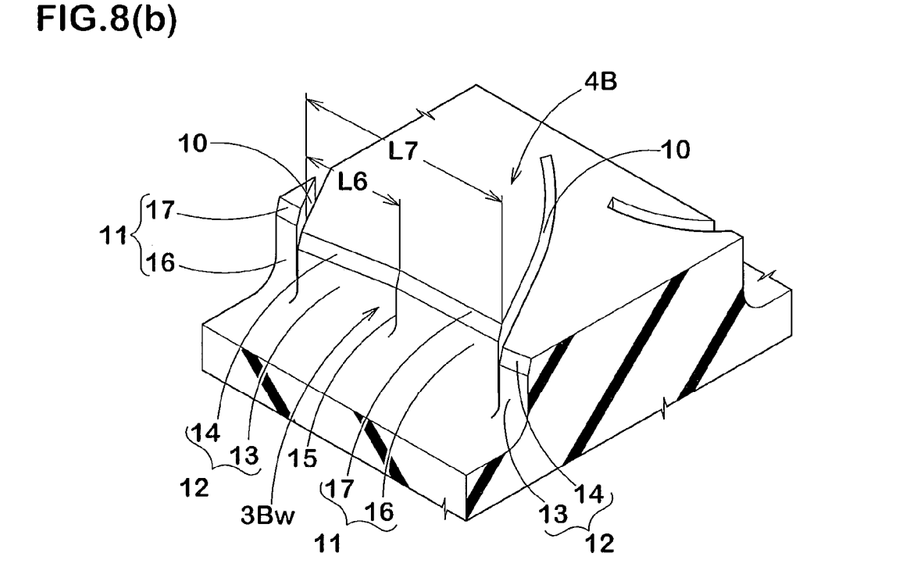

FIG. 5 shows a dent portion 11 and protruded portions 12 in another embodiment.

The protruded portions 12 in this embodiment are formed on the both sides of the dent portion 11 between the lateral grooves 10 and 10 adjacent to each other in the circumferential direction of the tire. In addition, the dent portion 11 constitutes a ridge line formed by intersection of the protruded portions 12 and 12 on the both sides.

The thus configured protruded portions 12 and 12 allow the groove walls 3Bw of the shoulder longitudinal grooves 3B to be further irregularly shaped, and generate disturbance in vibration of air columns formed between the shoulder longitudinal grooves 3B and the road surface. In addition, the protruded portions 12 each have a main surface 13 and aslant surface 14 as in the previous embodiment, thereby preventing deterioration in drainage performance.

As shown in FIG. 1, the shoulder land portions 4C are formed as rib bodies extending circumferentially and continuously between the shoulder longitudinal grooves 3B and the tread edges 2t. The thus configured shoulder land portions 4C can suppress an amount of deformation in the lateral direction at cornering and improve cornering performance. Preferably, the maximum width W2c of the shoulder land portions 4C is desirably about 15 to 25% of the tread contact width TW.

In addition, the shoulder land portions 4C are each provided with the shoulder sipes 8C extending with gradual inclination from the shoulder longitudinal groove 3B outwardly in the tire axial direction and terminating without reaching the tread edge 2t; and shoulder lug grooves 18 extending with gradual inclination from the tread edge 2t inwardly in the tire axial direction and terminating without reaching the shoulder longitudinal groove 3B.

The shoulder sipes 8C and the shoulder lug grooves 18 are alternately arranged in the circumferential direction of the tire at the shoulder land portions 4C and can discharge smoothly water films between the shoulder land portions 4C and the road surface. Preferably, the angle α1c formed by the shoulder sipes 8C with respect to the tire circumferential direction is about 50 to 90 degrees, and a groove width W6 of the shoulder lug grooves 18 is about 3 to 7 mm, and a groove depth D6 (shown in FIG. 2) of the shoulder lug grooves 18 is about 5 to 9 mm.

As in the foregoing, a preferred embodiment of the present invention is described above. However, the present invention is not limited to the illustrated embodiment, and can be modified and carried out in various manners.

Comparative Test:

Tires having a basic structure shown in FIG. 1 were manufactured with protruded portions and dent portions shown in Table 1, and were evaluated for performance. In addition, the following comparative examples were evaluated in the same manner: a tire including a middle land portion with no protruded portion or dent portion shown in FIG. 6 (comparative example 1); a tire including a middle land portion with no slant surface at protruded portions or at dent portions shown in FIG. 7 (comparative example 2); a tire including a middle land portion in which a width and a radius length of a slant surface do not gradually increase shown in FIG. 8 (comparative example 8). Common specifications are as follows:

Tire size: 225/60 R18
Rim size: 18×7.0 J
Tread contact width TW: 182 mm
Maximum groove depth D1a of the center longitudinal groove: 8.5 mm
Maximum groove depth D1b of the shoulder longitudinal groove: 8.5 mm
Center sub-groove:
  Groove width W3: 2 mm, groove depth D3: 2 mm
Center land portion:
  Maximum width W2a: 20 mm, ratio (W2a/TW): 11.0%
  Groove depth D4 of the lateral groove: 7.0 mm
Shoulder land portion:
  Maximum width W2c: 37 mm, ratio (W2c/TW): 20.3%
Shoulder lag groove:
  Groove width W6: 4.8 mm
  Groove depth D6: 6.4 mm
Test procedures are as follows:

Drainage Performance:

In the test, test tires mounted on rims with an internal air pressure of 210 kPa were attached to 2400 cc FF-type Japanese passenger car. The test car was run on a wet asphalt road with 5 mm depth of water and sharply braked at a speed of 100 km/hr so that the ABS worked. The braking distance of each tires were measured. The results are shown with an index of 100 representing a value in comparative example 1. The larger the value, the better the performance.

Noise Performance:

The foregoing test car was run at a speed of 100 km/hr on a smooth road, and then the pattern noise during the run was evaluated in a feeling test by a test driver. The results are shown in an index of 100 representing a value in comparative example 1. The larger the value, the better the performance.

Uneven Wear Resistance:

The foregoing test car was run on a dry asphalt road for 8,000 km, and then the uneven wear on the middle portion that is the wear differences between the axially inner edge and the axially outer edge of the middle land portion were measured. The uneven wear were measured at three points in the circumferential direction of the tire, and the average values of uneven wear were calculated. The results are shown in an index of 100 representing a value in comparative example 1. The larger the value, the better the performance.

The results of the Tests are shown in Table 1.

TABLE 1

|  | Comparative example 1 | Comparative example 2 | Example 1 | Example 2 | Example 3 | Example 4 | Example 5 | Example 6 |
| --- | --- | --- | --- | --- | --- | --- | --- | --- |
| Perpendicular view of middle land portion | FIG. 6 | FIG. 7 | FIG. 4 | FIG. 4 | FIG. 4 | FIG. 4 | FIG. 4 | FIG. 4 |
| Maximum groove width W1a of center longitudinal groove (mm) | 12.5 | 12.5 | 12.5 | 12 | 13 | 12.5 | 12.5 | 12.5 |
| Maximum groove width W1b of shoulder longitudinal groove (mm) | 7.8 | 7.8 | 7.8 | 8.0 | 7.2 | 7.8 | 7.8 | 7.8 |
| Ratio (W1a/W1b) (times) | 1.60 | 1.60 | 1.60 | 1.50 | 1.81 | 1.60 | 1.60 | 1.60 |
| Angle α4 of lateral groove (degrees) | 50 | 50 | 50 | 50 | 50 | 60 | 30 | 50 |
| Maximum length L5m of protruded portion (mm) | — | 1.5 | 1.5 | 1.5 | 1.5 | 1.5 | 1.5 | 0.8 |
| Ratio (L5m/W1b) (%) | — | 19.2 | 19.2 | 18.8 | 20.8 | 19.2 | 19.2 | 10.3 |
| Maximum length D5m of slant surface of protruded portion (mm) | — | — | 2.5 | 2.5 | 2.5 | 2.5 | 2.5 | 2.5 |
| Ratio (D5m/D1b) (%) | — | — | 29.4 | 29.4 | 29.4 | 29.4 | 29.4 | 29.4 |
| Maximum length D7m of slant surface of dent portion (mm) | — | — | 2.5 | 2.5 | 2.5 | 2.5 | 2.5 | 2.5 |
| Ratio (D7m/D1b) (%) | — | — | 29.4 | 29.4 | 29.4 | 29.4 | 29.4 | 29.4 |
| Length L6 from one lateral groove to boundary (mm) | — | — | 15 | 15 | 15 | 15 | 15 | 15 |
| Length L7 between lateral grooves (mm) | — | — | 30 | 30 | 30 | 30 | 30 | 30 |
| Ratio (L6/L7) (times) | — | — | 0.50 | 0.50 | 0.50 | 0.50 | 0.50 | 0.50 |
| Drainage performance (index) [Larger values are better] | 100 | 80 | 110 | 105 | 115 | 103 | 115 | 112 |
| Noise resistance (index) [Larger values are better] | 100 | 110 | 115 | 117 | 110 | 112 | 115 | 111 |
| Uneven wear resistance (index) [Larger values are better] | 100 | 90 | 100 | 100 | 100 | 105 | 98 | 100 |

|  | Example 7 | Example 8 | Example 9 | Example 10 | Example 11 | Example 12 | Example 13 |
| --- | --- | --- | --- | --- | --- | --- | --- |
| Perpendicular view of middle land portion | FIG. 4 | FIG. 8 | FIG. 4 | FIG. 4 | FIG. 4 | FIG. 4 | FIG. 5 |
| Maximum groove width W1a of center longitudinal groove (mm) | 12.5 | 12.5 | 12.5 | 12.5 | 12.5 | 12.5 | 12.5 |
| Maximum groove width W1b of shoulder longitudinal groove (mm) | 7.8 | 7.8 | 7.8 | 7.8 | 7.8 | 7.8 | 7.8 |
| Ratio (W1a/W1b) (times) | 1.60 | 1.60 | 1.60 | 1.60 | 1.60 | 1.60 | 1.60 |
| Angle α4 of lateral groove (degrees) | 50 | 50 | 50 | 50 | 50 | 50 | 50 |
| Maximum length L5m of protruded portion (mm) | 2.3 | 1.5 | 1.5 | 1.5 | 1.5 | 1.5 | 1.5 |
| Ratio (L5m/W1b) (%) | 29.5 | 19.2 | 19.2 | 19.2 | 19.2 | 19.2 | 19.2 |
| Maximum length D5m of slant surface of protruded portion (mm) | 2.5 | 2.5 | 1.3 | 3.0 | 2.5 | 2.5 | 2.5 |
| Ratio (D5m/D1b) (%) | 29.4 | 29.4 | 15 | 35 | 29.4 | 29.4 | 29.4 |
| Maximum length D7m of slant surface of dent portion (mm) | 2.5 | 2.5 | 1.3 | 3.0 | 2.5 | 2.5 | — |
| Ratio (D7m/D1b) (%) | 29.4 | 29.4 | 15 | 35 | 29.4 | 29.4 | — |
| Length L6 from one lateral groove to boundary (mm) | 15 | 15 | 15 | 15 | 10 | 20 | 15 |
| Length L7 between lateral grooves (mm) | 30 | 30 | 30 | 30 | 30 | 30 | 30 |
| Ratio (L6/L7) (times) | 0.50 | 0.50 | 0.50 | 0.50 | 0.33 | 0.67 | 0.50 |
| Drainage performance (index) [Larger values are better] | 108 | 105 | 104 | 113 | 110 | 108 | 106 |
| Noise resistance (index) [Larger values are better] | 118 | 116 | 116 | 111 | 106 | 115 | 116 |
| Uneven wear resistance (index) [Larger values are better] | 98 | 92 | 100 | 100 | 105 | 100 | 96 |

As the result of the test, it has been confirmed that examples according to the present invention are improved in the noise performance while keeping the drainage performance and uneven wear resistance.

What is claimed is:

1. A pneumatic tire comprising a tread portion provided with:
   at least two circumferentially and continuously extending longitudinal grooves,
   at least one land portion divided between the longitudinal grooves, and
   a first lateral groove and a second lateral groove being provided with the land portion,
   said first and second lateral grooves having one end communicating with one of the longitudinal grooves and the other end extending toward a tire equator,
   said longitudinal groove having a groove wall to which said first and second lateral grooves are connected,
   in a section of the land portion between said first and second lateral grooves adjacent to a circumferential direction of the tire, said groove wall having at least one protruded portion and a dent portion,
   the protruded portion comprising a main surface which extends radially outside from the groove bottom of the longitudinal groove and a slant surface extending from a radially outer edge of the main surface to a ground contact surface of the land portion and having an inclined angle larger than that of the main surface, wherein the main surface of the protruded portion is inclined with respect to the circumferential direction of the tire so as to gradually reduce a width of the longitudinal groove toward the first lateral groove, and wherein the slant surface of the protruded portion has a width in the axial direction of the tire and the width of said slant surface gradually increases toward the first lateral groove,
   the dent portion comprising a main surface which extends radially outside from the groove bottom of the longitudinal groove, and a slant surface extending from a radially outer edge of the main surface to the ground contact surface of the land portion and having an inclined angle larger than that of the main surface, wherein the main surface of the dent portion extends in parallel with the circumferential direction of the tire.

2. The pneumatic tire according to claim 1, wherein the slant surface of the protruded portion has a height in the radial direction of the tire, and the height of the slant surface of the protruded portion gradually increases toward the first lateral groove.

3. The pneumatic tire according to claim 1, wherein
   the groove wall has a boundary between the dent portion and the protruded portion, wherein the boundary is an intersection where the main surface of the protruded portion and the main surface of the dent portion intersect, and
   a boundary is located at a circumferential length from the first lateral groove being in a range of from 0.33 to 0.67 times of a circumferential length between said first and second lateral grooves adjacent to a circumferential direction of the tire.

4. The pneumatic tire according to claim 1, wherein said first and second lateral grooves have a width of from 1.0 to 2.0 mm and an inclination angle of 30 to 60 degrees with respect to the axial direction of the tire.

5. The pneumatic tire according to claim 1, wherein
   said longitudinal grooves include a pair of center longitudinal grooves disposed on both side of the tire equator and a pair of shoulder longitudinal grooves disposed axially outside the center longitudinal grooves, and
   a width of the center longitudinal groove is in a range of from 1.5 to 1.8 times of a width of the shoulder longitudinal groove.

6. The pneumatic tire according to claim 5, wherein
   the land portion is a middle land portion which is formed between the shoulder longitudinal groove and the center longitudinal groove, and
   the protruded portion and the dent portion are provided on a groove wall of the shoulder longitudinal groove.

7. The pneumatic tire according to claim 3, wherein the main surface of the protruded portion extends from the boundary to the first lateral groove.

8. The pneumatic tire according to claim 7, wherein the main surface of the dent portion extends in parallel with the circumferential direction of the tire from the boundary to the second lateral groove.

9. The pneumatic tire according to claim 3,
   wherein the slant surface of the protruded portion has a width in the axial direction of the tire, and
   the width of the slant surface of the protruded portion gradually increases to the first lateral groove from the boundary.

10. The pneumatic tire according to claim 9,
   wherein the slant surface of the dent portion has a width in the axial direction of the tire, and
   the width of the slant surface of the dent portion gradually increases to the second lateral groove from the boundary.

11. The pneumatic tire according to claim 3,
   wherein the slant surface of the protruded portion has a height in the radial direction of the tire, and
   the height of the slant surface of the protruded portion gradually increases to the first lateral groove from the boundary.

12. The pneumatic tire according to claim 11,
   wherein the slant surface of the dent portion has a height in the radial direction of the tire, and
   the height of the slant surface of the dent portion gradually increases to the second lateral groove from the boundary.

13. A pneumatic tire comprising a tread portion provided with:
   at least two circumferentially and continuously extending longitudinal grooves,
   at least one land portion divided between the longitudinal grooves, and
   a first lateral groove and a second lateral groove being provided with the land portion,
   said first and second lateral grooves having one end communicating with one of the longitudinal grooves and the other end extending toward a tire equator,
   said longitudinal groove having a groove wall to which said first and second lateral grooves are connected,
   in a section of the land portion between said first and second lateral grooves adjacent to a circumferential direction of the tire, said groove wall having at least one protruded portion and a dent portion,
   the protruded portion comprising a main surface which extends radially outside from the groove bottom of the longitudinal groove and a slant surface extending from a radially outer edge of the main surface to a ground contact surface of the land portion and having an inclined angle larger than that of the main surface, wherein the main surface of the protruded portion is inclined with respect to the circumferential direction of the tire so as to gradually reduce a width of the longitudinal groove toward the first lateral groove, and wherein the slant surface of the protruded portion has a height in the radial direction of the tire and the height of the slant surface of the protruded portion gradually increases toward the first lateral groove, the dent portion comprising a main surface which extends radially outside from the groove bottom of the longitudinal groove, and a slant surface extending from a radially outer edge of the main surface to the ground contact surface of the land portion and having an inclined angle larger than that of the main surface, wherein the main surface of the dent portion extends in parallel with the circumferential direction of the tire.

14. A pneumatic tire comprising a tread portion provided with:
- at least two circumferentially and continuously extending longitudinal grooves,
- at least one land portion divided between the longitudinal grooves, and
- a first lateral groove and a second lateral groove being provided with the land portion, wherein said first and second lateral grooves have a width of from 1.0 to 2.0 mm and an inclination angle of 30 to 60 degrees with respect to the axial direction of the tire, said first and second lateral grooves having one end communicating with one of the longitudinal grooves and the other end extending toward a tire equator, said longitudinal groove having a groove wall to which said first and second lateral grooves are connected, in a section of the land portion between said first and second lateral grooves adjacent to a circumferential direction of the tire, said groove wall having at least one protruded portion and a dent portion, the protruded portion comprising a main surface which extends radially outside from the groove bottom of the longitudinal groove, and a slant surface extending from a radially outer edge of the main surface to a ground contact surface of the land portion and having an inclined angle larger than that of the main surface, wherein the main surface of the protruded portion is inclined with respect to the circumferential direction of the tire so as to gradually reduce a width of the longitudinal groove toward the first lateral groove, the dent portion comprising a main surface which extends radially outside from the groove bottom of the longitudinal groove, and a slant surface extending from a radially outer edge of the main surface to the ground contact surface of the land portion and having an inclined angle larger than that of the main surface, wherein the main surface of the dent portion extends in parallel with the circumferential direction of the tire.

* * * * *